A. W. MORFORD.
TAIL LIGHT.
APPLICATION FILED DEC. 12, 1916.
1,222,442.
Patented Apr. 10, 1917.
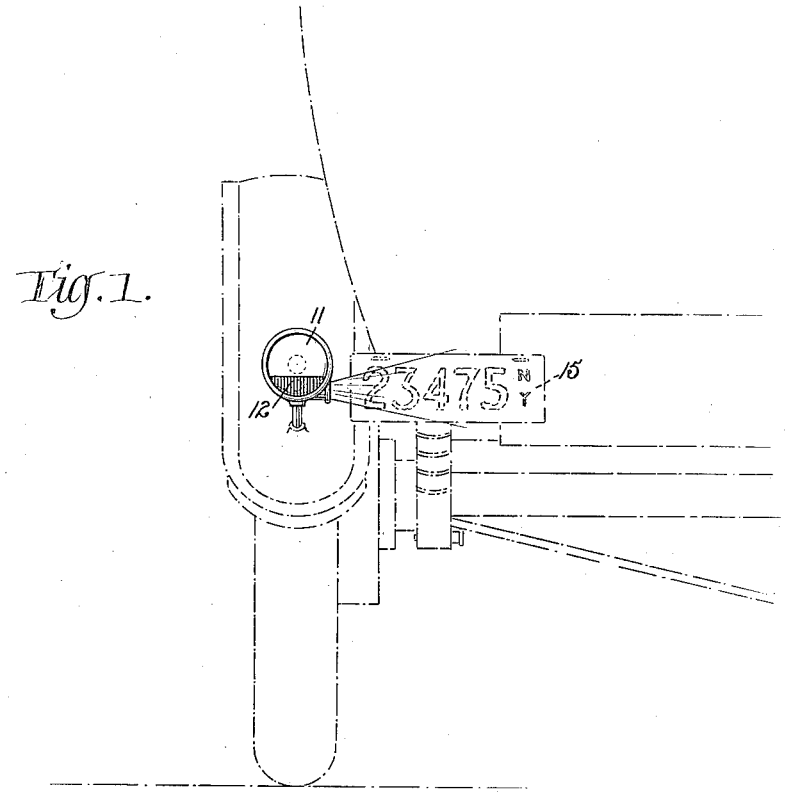
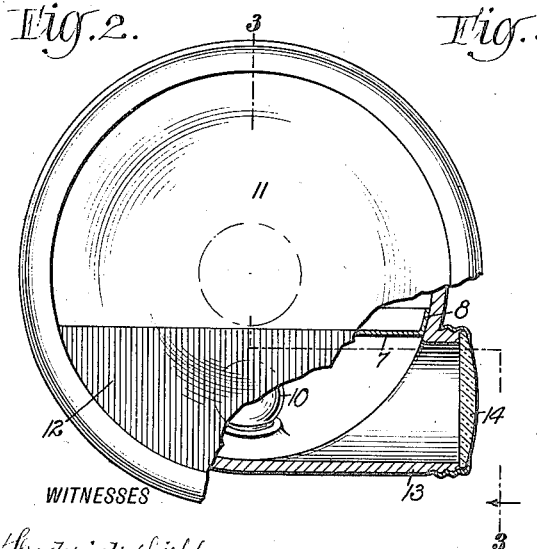
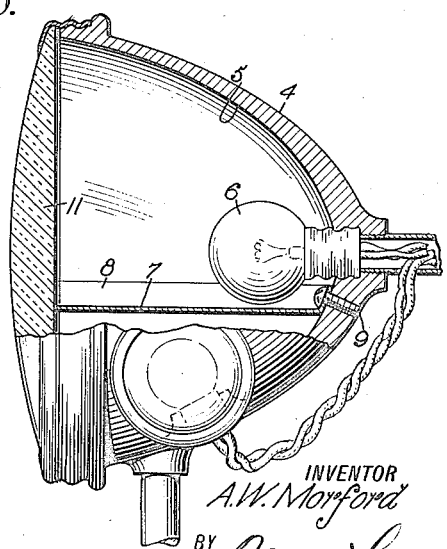
WITNESSES
INVENTOR
A.W. Morford
BY
ATTORNEYS

UNITED STATES PATENT OFFICE.

ALBERT W. MORFORD, OF NEW MONMOUTH, NEW JERSEY.

TAIL-LIGHT.

1,222,442. Specification of Letters Patent. Patented Apr. 10, 1917.

Application filed December 12, 1916. Serial No. 136,443.

*To all whom it may concern:*

Be it known that I, ALBERT W. MORFORD, a citizen of the United States, and a resident of New Monmouth, in the county of Monmouth and State of New Jersey, have invented a new and Improved Tail-Light, of which the following is a full, clear, and exact description.

My invention relates to a tail light embodying two independent light sources controllable from the seat of the driver of a vehicle.

An object is to provide a tail light which carries an auxiliary searching light adapted to be rendered operative independently of the tail light when backing the vehicle.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1 is an elevation of a tail light shown applied to a motor vehicle, which is outlined in dotted lines;

Fig. 2 is an elevation of the light, a portion of the light being broken out to show the details of construction; and Fig. 3 is a section on line 3—3, Fig. 2.

Referring to the drawings, 4 is the housing which presents a parabolic reflector 5 in the focus of which a source of light 6 is provided. Positioned below the source of light 6 is a partition 7 having a curved edge the shape of which is that of a parabola, so as to fit snugly into the reflector 5 below the light. It is bordered at the curved edge by a flange 8 which may be locked to the housing by suitable locking means 9. Another source of light 10 is located within the reflector below the partition 7. A transparent member 11, which covers the reflector and incloses the lights within the reflector, has an orange-colored portion 12 thereof, which is below the partition 7 and which is opposite the source of light 10. This portion of the lamp serves as the real tail light.

The housing 4 has in addition a lateral tubular arm or projection 13 in alinement with the source of light 10 which terminates with a transparent member 14 to permit the light from the source 10 to fall on the licenses 15 disposed in proximity of the transparent member 14. Each of the sources of light has an independent control. Normally the source of light 10 is effective, but when the vehicle is to be backed, the source of light 6 is energized to illuminate the space in the rear of the vehicle to facilitate the backing of the same, the ordinary tail light being insufficient for that purpose. The light 6 may be of considerably higher candle power than the source of light 10, as its use is only intermittent when compared with that of the light source 10.

By arranging a tail light in the manner as described, I produce a signal lamp having two independent light sources, one presenting an ordinary tail light and the other a search light for facilitating the backing of a vehicle in dark places.

I claim:

1. A light of the class described presenting a parabolic reflector, a source of light in the focus of the reflector, a second source of light below the first and within the reflector, a partition separating the two sources, a transparent member closing the reflector and presenting a colored portion to the second-mentioned source of light, and means associated with said second source of light for producing a light beam laterally of the reflector.

2. In a light of the class described, a housing presenting a parabolic reflector, a source of light in the focus thereof, a second source of light within the reflector below the first, a partition having a curved edge in the form of a parabola, a flange bordering the curved edge of the partition and adapted to engage the reflector to separate the two sources of light within the reflector, a transparent member closing the reflector and presenting a colored portion beyond the partition for the second mentioned source of light, said housing having a lateral tubular extension alining with the second source of light, and a transparent member closing said tubular portion.

ALBERT W. MORFORD.